United States Patent
Satomi

(10) Patent No.: US 7,827,482 B2
(45) Date of Patent: Nov. 2, 2010

(54) DATA-EDIT APPARATUS FOR EDITING DATA BY USING DATA TRANSMITTED FROM SERVER AND TRANSMITTING EDITED DATA VIA NETWORK, PROGRAM USED THEREFOR, AND DATA-EDIT METHOD

(75) Inventor: Hiroshi Satomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 11/208,824

(22) Filed: Aug. 22, 2005

(65) Prior Publication Data

US 2006/0050301 A1 Mar. 9, 2006

(30) Foreign Application Priority Data

Sep. 3, 2004 (JP) ............................. 2004-257624

(51) Int. Cl.
*G06F 17/00* (2006.01)
(52) U.S. Cl. .................................................... 715/255
(58) Field of Classification Search ................. 715/200, 715/201, 255
See application file for complete search history.

(56) References Cited

U.S. PATENT DOCUMENTS

| | | | |
|---|---|---|---|
| 6,628,822 B1* | 9/2003 | Nakabayashi et al. | 382/162 |
| 7,124,360 B1* | 10/2006 | Drenttel et al. | 715/205 |
| 7,587,448 B2* | 9/2009 | Usami | 709/203 |
| 7,617,126 B2* | 11/2009 | Satomi et al. | 705/26 |
| 2002/0073121 A1* | 6/2002 | Sano et al. | 707/517 |
| 2002/0122202 A1* | 9/2002 | Nagashima | 358/1.15 |
| 2003/0042253 A1* | 3/2003 | Ozawa et al. | 219/702 |
| 2003/0061178 A1* | 3/2003 | Ogawa | 705/408 |
| 2003/0219149 A1* | 11/2003 | Vailaya et al. | 382/128 |
| 2003/0220995 A1* | 11/2003 | Hitaka et al. | 709/223 |
| 2003/0236836 A1* | 12/2003 | Borthwick | 709/204 |
| 2004/0100506 A1* | 5/2004 | Shiota et al. | 345/838 |
| 2004/0111493 A1* | 6/2004 | Yamaguchi et al. | 709/219 |
| 2004/0114172 A1* | 6/2004 | Ohyama et al. | 358/1.13 |
| 2004/0145762 A1* | 7/2004 | Kurashina | 358/1.11 |
| 2004/0156076 A1* | 8/2004 | Togami et al. | 358/2.1 |
| 2004/0163049 A1* | 8/2004 | Mori et al. | 715/527 |
| 2005/0006357 A1* | 1/2005 | Connor | 219/121.69 |

(Continued)

FOREIGN PATENT DOCUMENTS

JP 2000-148425 A 5/2000

(Continued)

OTHER PUBLICATIONS

Reolofs, History of the Portable Network Graphics (PNG) Format, Google 2003, pp. 1-8.*

(Continued)

*Primary Examiner*—Cong-Lac Huynh
(74) *Attorney, Agent, or Firm*—Canon U.S.A., Inc. I. P. Division

(57) ABSTRACT

A data edit method and apparatus for editing electronic album data requesting printing of the album. The method and apparatus comprise receiving data in a first format from a first apparatus, generating edited data by using the first-format data, converting the first-format edited data into a second format, and transmitting the second-format data to a second apparatus.

4 Claims, 9 Drawing Sheets

U.S. PATENT DOCUMENTS

| | | | |
|---|---|---|---|
| 2005/0046643 A1* | 3/2005 | Termotto | 345/619 |
| 2005/0052693 A1* | 3/2005 | Kadota | 358/1.15 |
| 2005/0144559 A1* | 6/2005 | Kim | 715/530 |
| 2005/0162718 A1* | 7/2005 | Kim et al. | 358/537 |
| 2005/0254089 A1* | 11/2005 | Oliver et al. | 358/1.16 |
| 2005/0254092 A1* | 11/2005 | Lee | 358/1.18 |
| 2005/0262437 A1* | 11/2005 | Patterson et al. | 715/517 |
| 2005/0289117 A1* | 12/2005 | Hiraishi et al. | 707/2 |
| 2006/0119872 A1* | 6/2006 | Koizumi | 358/1.13 |
| 2006/0149789 A1* | 7/2006 | Sorge et al. | 707/201 |
| 2007/0106690 A1* | 5/2007 | Denniston et al. | 707/104.1 |
| 2007/0242284 A1* | 10/2007 | Schalkwijk et al. | 358/1.6 |
| 2008/0095513 A1* | 4/2008 | Yamasaki et al. | 386/94 |
| 2008/0189191 A1* | 8/2008 | Roche | 705/26 |
| 2008/0300859 A1* | 12/2008 | Chen et al. | 704/7 |
| 2009/0048940 A1* | 2/2009 | Hill et al. | 705/26 |

FOREIGN PATENT DOCUMENTS

| | | |
|---|---|---|
| JP | 2002-318677 A | 10/2002 |

OTHER PUBLICATIONS

Balabanovic et al., Storytelling with Digital Photographs, ACM 2000, pp. 564-571.*

Cybulski et al., Composing Multimedia Artefacts for Reuse, Google 2000, pp. 1-15.*

* cited by examiner

DATA-EDIT APPARATUS FOR EDITING DATA BY USING DATA TRANSMITTED FROM SERVER AND TRANSMITTING EDITED DATA VIA NETWORK, PROGRAM USED THEREFOR, AND DATA-EDIT METHOD

BACKGROUND OF THE INVENTION

1. Field of the Invention

The present invention relates to a technology for editing an album by arranging image data and/or text data according to a predetermined template on a user terminal and transmitting a request to print the album from the user terminal to a server on a network.

2. Description of the Related Art

Image-edit software programs are becoming high performance and multifunctional with increases in the progress of the computer technologies and the functions of digital cameras in recent years. It is preferable that data used and stored by the multifunctional image-edit software program is in a special-purpose format compatible with the functions of the image-edit software program.

On the other hand, as high-speed network-communication technologies are becoming widely available, it has become possible to transmit a request to print album data to a print site of a print service, where the print site is connected to a network. Subsequently, a high-quality print product is generated. The above-described print service offers printing service including album binding or the like.

FIG. 14 shows an example of a known print system including a server 1401 configured to provide template data and manage the reception of print orders, the settlement of accounts, and so forth, a user terminal 1402 configured to edit a printed matter including an album or the like based on template data downloaded from the server 1401, and print sites A, B, and C (1403, 1404, and 1405) of print services who actually performs binding or the like according to the details of order data transmitted from the user terminal 1402. The above-described components of the print system are connected to one another via a network.

The user terminal 1402 downloads template data in a special-purpose format from the server 1401 and edits an album by arranging image data on the template data by, for example, using the functions of an album-edit application according to instructions transmitted from the user terminal 1402 operated by a user. The edited data is stored in the user terminal 1402. Upon receiving an order for the edited album, the edited data in the above-described special-purpose format is transmitted from the user terminal 1402 to the server 1401.

The server 1401 transmits the edited data to one of the above-described print sites corresponding to a print service with which printing of the edited data is charged. At that time, however, the server 1401 has to convert the edited data in the special-purpose format into data in a file format that can be accepted by the print site. Therefore, the server 1401 has to include a converter for each of print services, the converter being configured to convert data in the special-purpose format into data in a file format that can be accepted by each of the print services. Further, the server 1401 has to perform format conversion by using the converters. Thus, the server 1401 is under heavy loads.

Further, when the edited data transmitted from the user terminal 1402 includes text data, the server 1401 has to prepare the same font as that of the text data for performing font rasterization or the like, so as to convert the special-purpose-format edited data into data in a format compatible with the print site to which the edited data is transmitted. Therefore, various kinds of fonts have to be prepared, so as to meet the requirements of user terminals including the user terminal 1402.

SUMMARY OF THE INVENTION

The present invention eliminates the need for a server to convert the format of data into a format that can be accepted by a print site, thus dispersing the load placed on the server. Further, the present invention eliminates the need for a server to prepare fonts that meet the requirements of user terminals, thus enabling user terminals to generate albums by using any fonts.

A data-edit apparatus according to an aspect of the present invention can communicate with an external apparatus via a network. The data-edit apparatus includes a reception unit adapted to receive data in a first format, the data being transmitted from the external apparatus, an edit unit adapted to generate edited data by using the first-format data received by the reception unit, a conversion unit adapted to convert the edited data generated by the edit unit into data in a second format, and a transmission unit adapted to transmit the second-format edited data generated by the conversion performed by the conversion unit to the external apparatus.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described in detail with reference to the attached drawings.

First Embodiment

Figure 1:
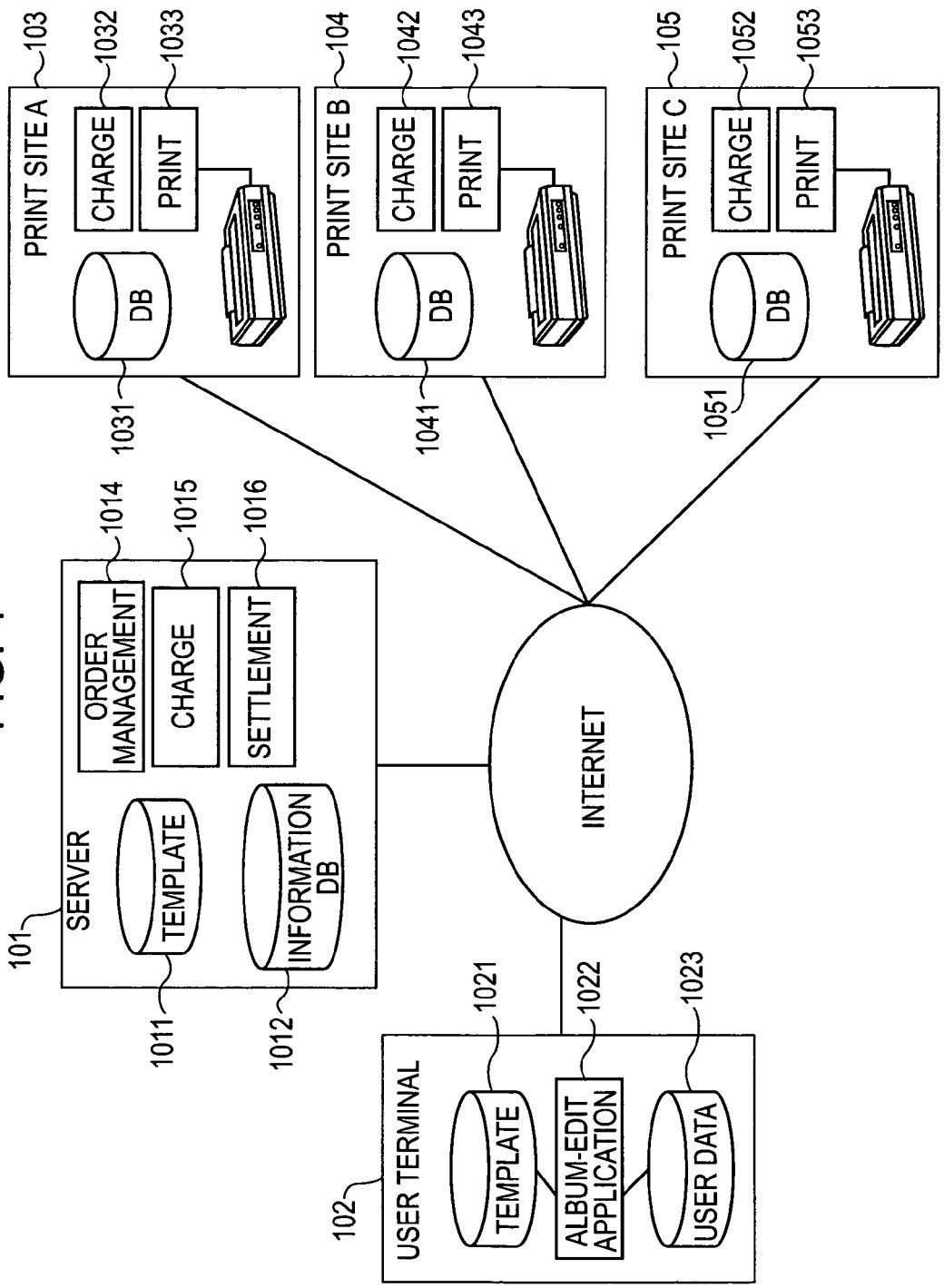
FIG. 1 schematically shows the configuration of a print system according to a first embodiment of the present invention.

FIG. 1 shows the schematic configuration of a print system according to a first embodiment of the present invention. The print system shown in FIG. 1 includes a server 101 configured to store and/or provide template data items used for generating a high-quality printed matter, and manage the reception of a print orders transmitted from a user terminal 102, the settlement of accounts, and so forth, the user terminal 102 configured to download template data items from the server 101, generate desired editing data according to the downloaded template data items, and transmit an order for album printing, and print sites 103, 104, and 105 provided by at least one print service that actually performs binding or the like based on the details of the order transmitted from the user terminal 102. The above-described components of the print system are connected to one another via the Internet. Since the above-described network shown in FIG. 1 is only a single embodiment of the present invention, any number of user terminals and print sites can be used for achieving the present invention.

The server 101 includes a template-storage unit 1011 storing the template data items, an information database (DB) 1012 storing album-order-reception management information, charge information, account-settlement information, and so forth, an order-management unit 1014 configured to manage the result of album-order reception, a charge unit 1015 configured to charge for the album-order reception, and an account-settlement unit 1016 configured to perform the settlement of accounts.

The user terminal 102 includes a template-storage unit 1021 configured to store the template data items downloaded from the server 101, an album-edit application 1022, and a user-data storage unit 1023 configured to store edit data on an album that had already been edited, or that is currently edited.

The print site A 103 includes a database 1031 storing edited data on an album transferred from the server 101, a print-processing unit 1033 configured to print and externally transmit the edited data stored in the database 1031, and a charge-processing unit 1032 configured to charge for the print processing. The print site B 104 includes a database 1041 storing edited data on an album transferred from the server 101, a print-processing unit 1043 configured to print and externally transmit the edited data stored in the database 1041, and a charge-processing unit 1042 configured to charge for the print processing. The print site C 105 includes a database 1051 storing edited data on an album transferred from the server 101, a print-processing unit 1053 configured to print and externally transmit the edited data stored in the database 1051, and a charge-processing unit 1052 configured to charge for the print processing.

Figure 3:
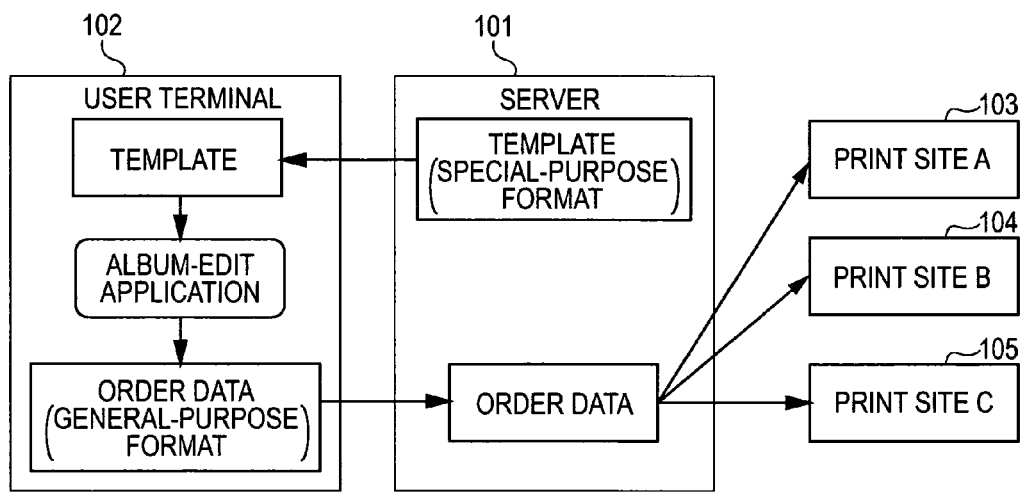
FIG. 3 illustrates the operations of a print system according to the first embodiment of the present invention.

Next, operations of the print system according to the first embodiment will be described with reference to FIG. 3. The user terminal 102 downloads template data items in a special-purpose format from the server 101 and stores the downloaded template data items therein. A user of the print system selects a desired template data item from among the template data items stored in the user terminal 102, edits an album by arranging image data, text data, and so forth on the template data, thereby generating edited data. Here, the edited data on the album is stored as data in the same special-purpose format as is the case with the template data.

If the user performs an operation for transmitting an order for the edited album on the user terminal 102, the edited data stored in the special-purpose format is converted to data in the general-purpose format and transmitted to the server 101 as order data.

Upon receiving the order data in the general-purpose format transmitted from the user terminal 102, the server 101 selects a print service that prints the order data and transmits the order data to the print site of the selected print service, such as the print site A 103.

After the order data is transmitted to the print site A 103, the print service corresponding to the print site A 103 prints the order data in the general-purpose format and generates an album. The generated album is transmitted to a predetermined destination.

Here, the special-purpose format denotes a file format that is not yet open to the public and that requires a special-purpose application program for reading and writing data. The general-purpose format denotes a file format that is open to the public and that is capable of being read by and written to by at least two application programs. The general-purpose format includes, for example, the portable document format (PDF).

Figure 2:
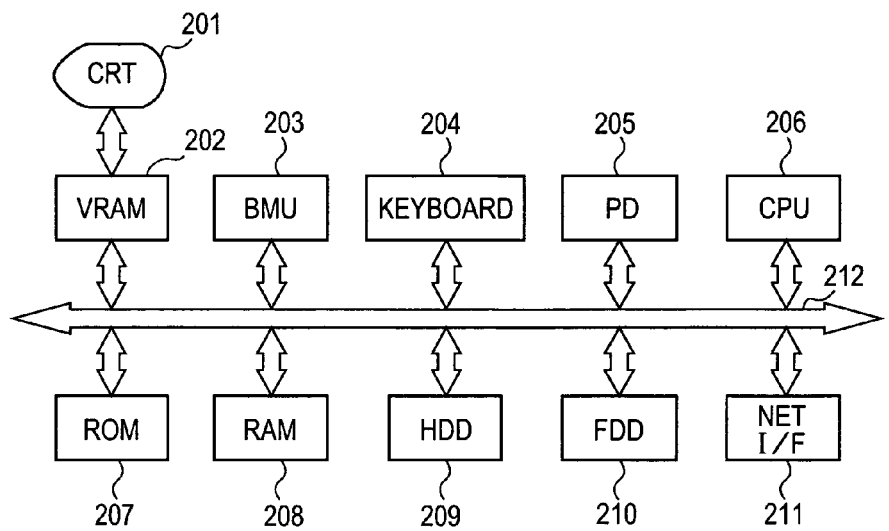
FIG. 2 shows the hardware configuration of a user terminal.

FIG. 2 shows the hardware configuration of the user terminal 102 that can be formed as a personal computer (PC) or the like.

In FIG. 2, a cathode-ray tube (CRT) 201 is provided as a display unit. Therefore, display images of edit information, including a document, a drawing, an image, and so forth, that are currently edited and user-interface information including an icon, a message, a menu, and so forth, are produced on a display screen of the CRT 201.

FIG. 2 also shows a video RAM (VRAM) 202. An image is drawn into the VRAM 202 so that the display image thereof is produced on the display screen of the CRT 201. Namely, image data is generated in the VRAM 202, transferred to the CRT 201 based on predetermined rules, and the display image of the image data is produced by the CRT 201.

FIG. 2 also shows a bit-move unit (BMU) 203 configured to control data transfer between memories such as the VRAM 202 and other memories and/or data transfer between the memories and an I/O device such as a network interface 211.

FIG. 2 also shows a keyboard 204 having various keys used for transmitting a document or the like and a pointing device (PD) 205 configured to, for example, point to an object shown on the display screen of the CRT 201. The object may be an icon, a menu, and so forth.

FIG. 2 also shows a central processing unit (CPU) 206 configured to control devices connected thereto according to a control program stored in a read-only memory (ROM) 207, a hard disk, or a floppy disk.

FIG. 2 also shows a read-only memory (ROM) 207 configured to store various control programs and data and a RAM 208 including a work area, a data-save area used during error processing is performed, and a load area for a control program, and so forth of the CPU 206.

FIG. 2 also shows a hard-disk drive (HDD) 209 configured to store control programs and contents executed in an information-processing device. For example, the hard disk of the user PC 102 stores electronic-album data, an album-edit program, and so forth.

FIG. 2 also shows a floppy disk drive (FDD) 210 configured to control access to a floppy disk and a network interface 211 configured to communicate with other information-processing devices, printers, and so forth.

FIG. 2 also shows a CPU bus 212 configured to store an address bus, a data bus, and a control bus. A control program can be transmitted from the ROM 207, a hard disk, or a floppy disk to the CPU 206. Otherwise, the control program can be transmitted from other information-processing device or the like to the CPU 206 via a network interface 211.

Figure 6:
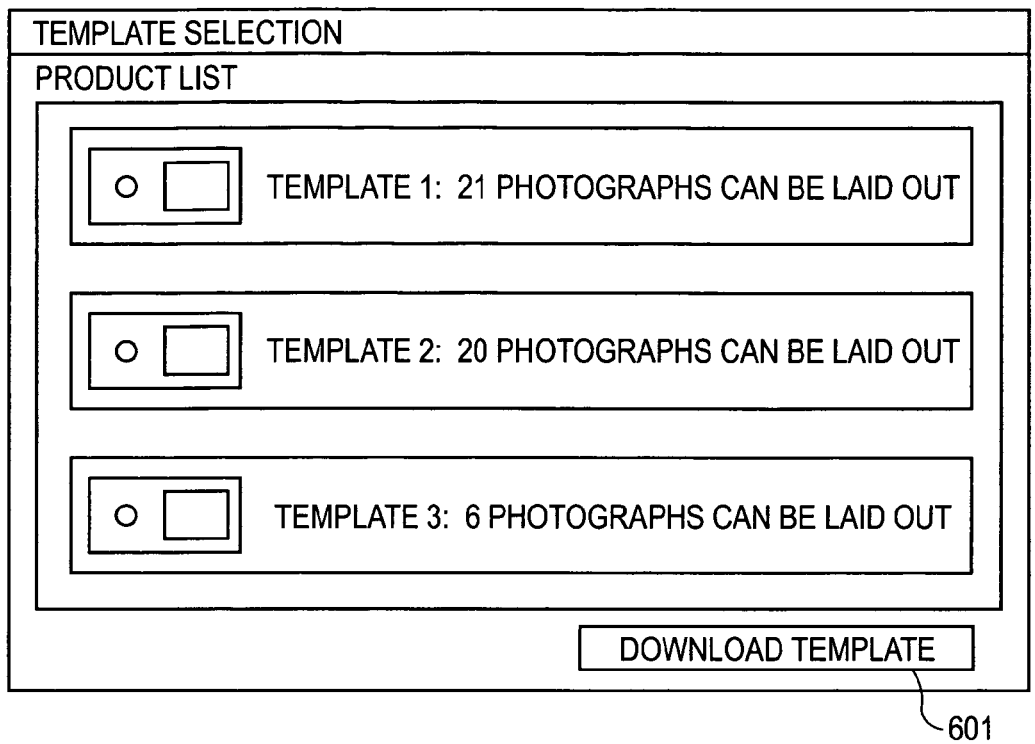
FIG. 6 shows an example configuration of a template-selection screen.

Next, operations of the user terminal 102 will be described in detail with reference to a flowchart shown in FIG. 4. The user terminal 102 accesses the server 101 via the network interface 211 according to an operation of the user. Subsequently, for example, a template-selection screen shown in FIG. 6 is displayed on the CRT 201.

When the user selects a desired template on the template-selection screen and selects the Download Template button 601, information about an instruction to acquire the selected template is transmitted from the user terminal 102 to the server 101 via the network interface 211.

Figure 4:
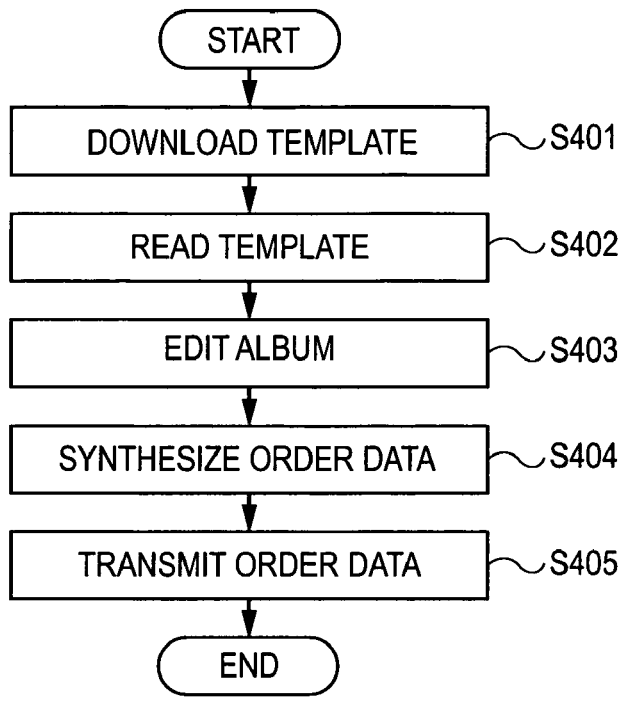
FIG. 4 is a flowchart showing the operations of a user terminal according to the first embodiment.

Turning to FIG. 4, in step S401, the template data corresponding to the above-described acquisition-instruction information is downloaded from the server 101 and the template data is stored in the HDD 209.

Figure 7:
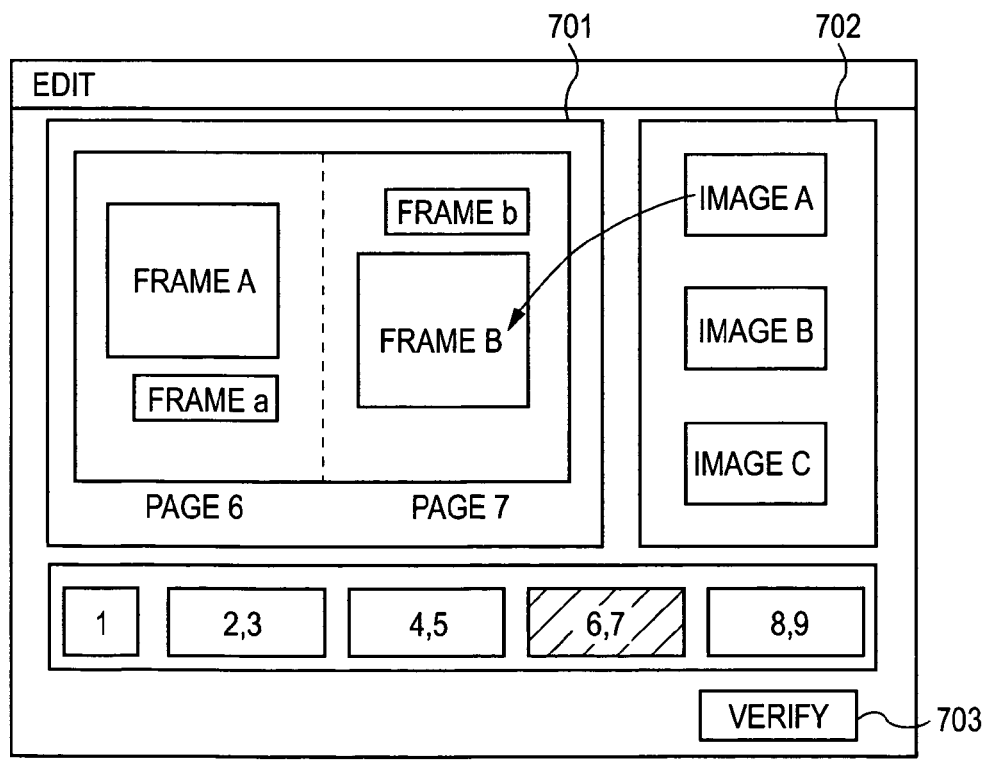
FIG. 7 shows an example configuration of an edit screen.

When the user selects a desired template data item from the template data stored in the HDD 209, in step S402, the selected template data item is read from the HDD 209 into the VRAM 208. Then, the selected template data item is shown on the CRT 201 as, for example, an edit screen as shown in FIG. 7.

On the other hand, data on an image photographed by a digital camera or the like is stored in the HDD 209. The part of the image data having been selected by the user, or the entire image data, is read into the VRAM 208 and displayed on the edit screen shown in FIG. 7.

Next, in step S403, the user edits an album on the edit screen. FIG. 7 shows a template-data display area 701 including frames A and B in which image data is laid out, and frames a and b in which text data is laid out. FIG. 7 also shows an image-data display area 702 configured to show the list of stored image data items.

Figure 10B:
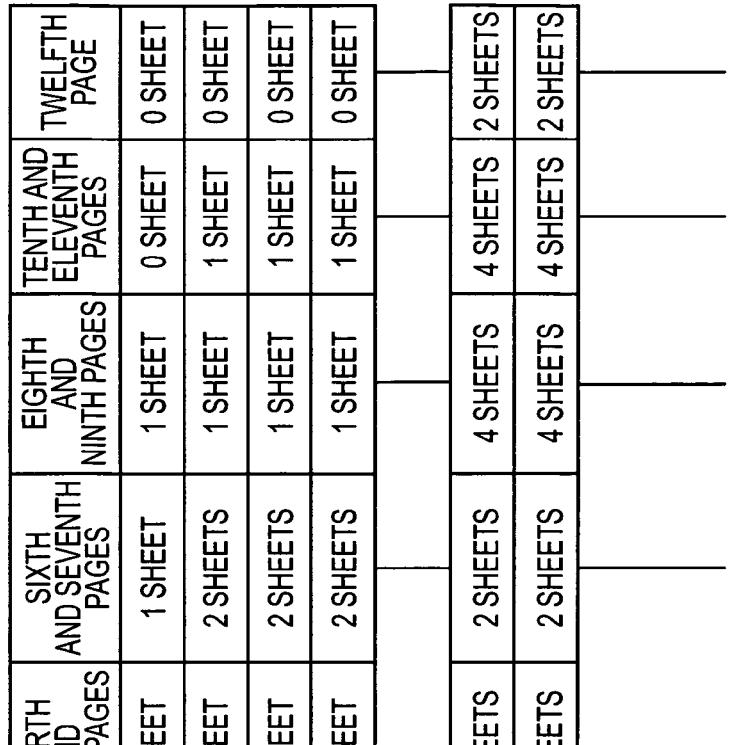
FIG. 10B also shows the configuration of the image-data layout table.
Figure 10A:
FIG. 10A schematically shows the configuration of an image-data layout table.

Here, processing for setting a frame in which image data and text data is laid out in the template-data display area 701 will be described. FIGS. 10A and 10B schematically show the configuration of an image-data layout table. As shown in FIG. 10A, the image-data layout table includes five-sheet-layout matrix data to twenty-one-sheet-layout matrix data. As shown in FIG. 10B, each layout matrix data shows the number of images that can be laid out in each page.

For example, if the user selects the data on a template in which twenty-one images can be laid out, the CPU 206 refers to the twenty-one-sheet-layout matrix data of the image-data layout table that is read from the HDD 209 to the RAM 208 and that is shown in FIGS. 10A and 10B, and acquires data on the number of images that can be laid out in each page. Namely, in the case of the twenty-one-sheet matrix data, the number of images that can be laid out in the first page is two, the number of images that can be laid out in the second and third pages is five, the number of images that can be laid out in the fourth and fifth pages is two, etc., and the number of images that can be laid out in the twelfth page is two.

Figure 11:
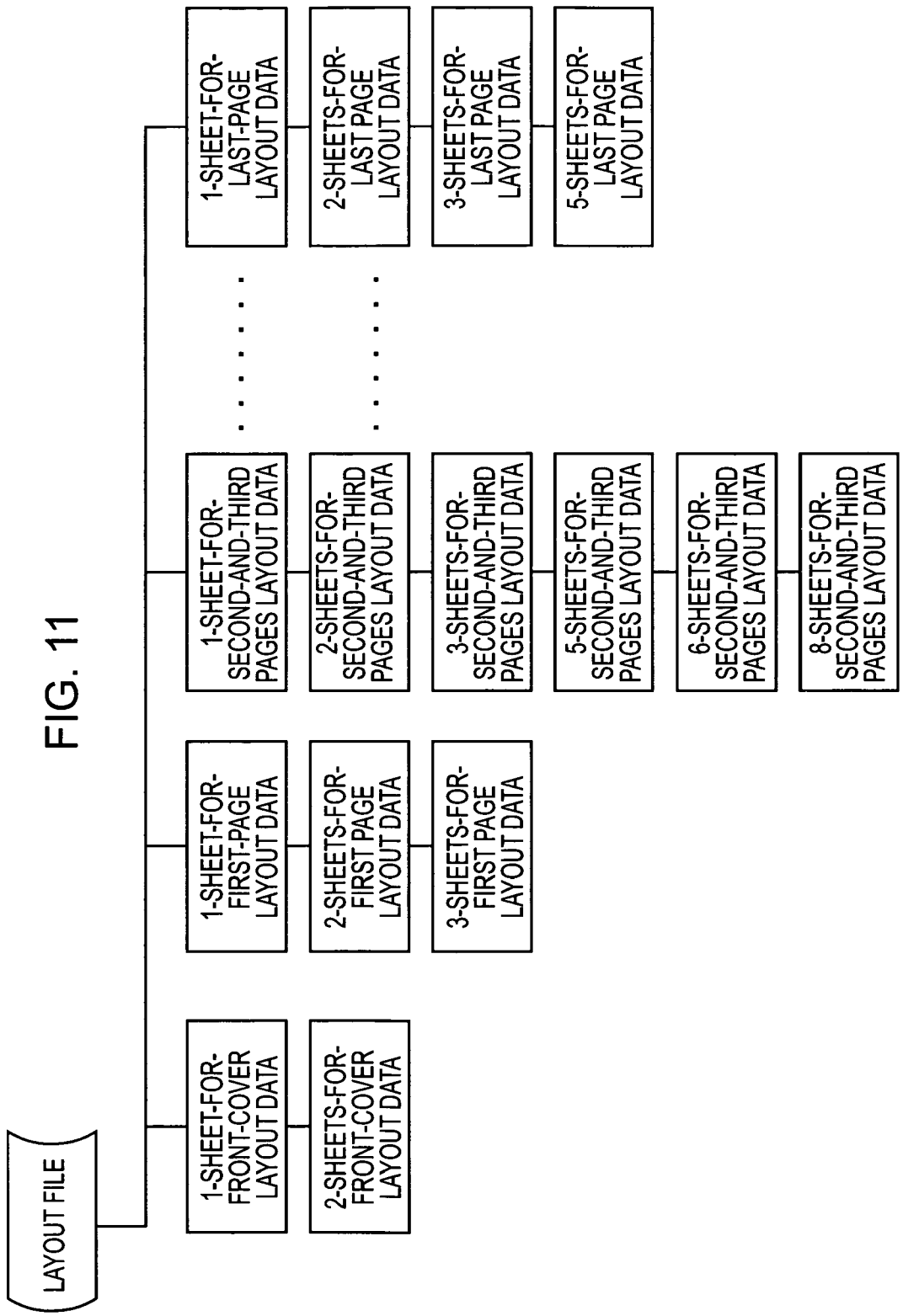
FIG. 11 schematically shows an example configuration of a layout file.

Next, a layout file shown in FIG. 11 is referred to, which is read from the HDD 209 to the RAM 208. As shown in FIG. 11, the layout file includes the layout data corresponding to the number of images that can be laid out in each page and the layout data corresponding to the number of images that can be laid out in a front cover.

When the data on the template in which twenty-one images can be laid out is selected, as described above, the image-data layout table shown in FIGS. 10A and 10B shows that the number of images that can be laid out in the first page is two, the number of images that can be laid out in the second and third pages is five, the number of images that can be laid out in the fourth and fifth pages is two, etc., and the number of images that can be laid out in the twelfth page is two. According to the configuration of the layout file shown in FIG. 11, layout data used when the number of images that can be laid out in the first page is two (two-sheets-for-first-page layout data), layout data used when the number of images that can be laid out in the second and third pages is five (five-sheets-for-second-and-third-page layout data), and so forth are provided. The CPU 206 refers to the layout data corresponding to each page, determines the layout used in the template-data display area shown on the edit screen, and produces the display image of the edit screen, as shown in FIG. 7.

The user selects the data on images laid out in frames A and B from the data on images shown in the image-data display area 702. FIG. 7 shows the edit screen corresponding to the sixth and seventh pages of the album. The same edit processing is performed for each of the pages of the album so that the desired album is generated. After the image-data is laid out and the text data is input for all of the pages, the user selects the "Verify" button 703, as shown in FIG. 7, whereby edited data that had been edited or that is currently edited is temporarily stored in the RAM 208 as data in a special-purpose format.

Figure 8:
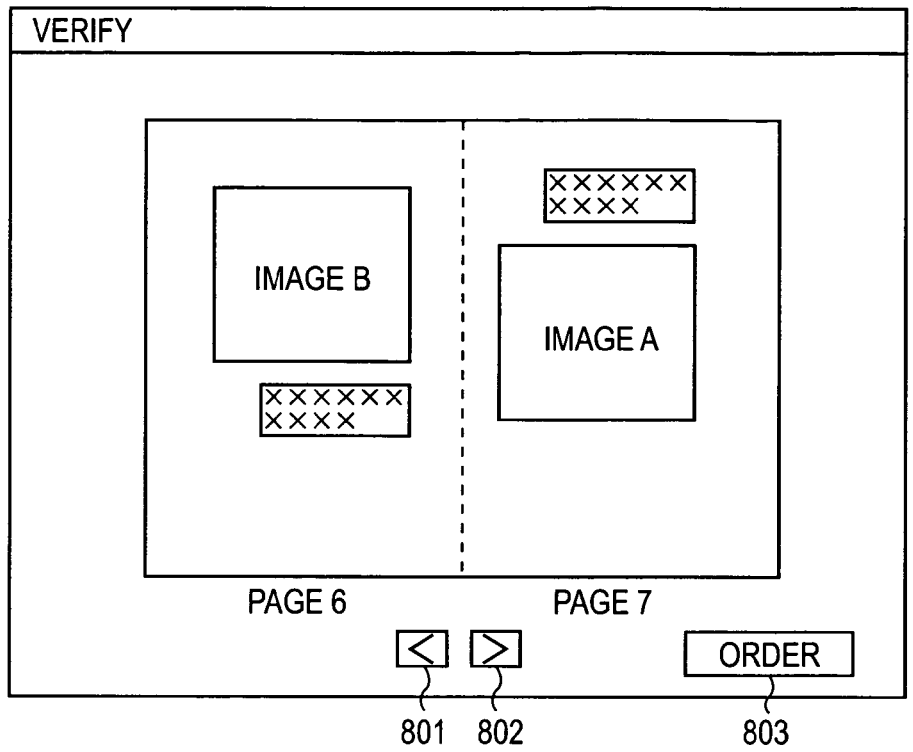
FIG. 8 shows an example configuration of a verification screen.

When the "Verify" button 703 is selected, a verification screen, as shown in FIG. 8, is displayed on the CRT 201. When a button 801 indicated by the specifier "<" is selected, the left page is turned so that the fourth and fifth pages are shown. When a button 802 indicated by the specifier ">" is selected, the right page is turned so that the eighth and ninth pages are shown. By operating the "<" button 801 and the ">" button 802, all of the pages of the generated album can be verified. If there is no problem in the generated album, the user selects the "Order" button 803.

Figure 9:
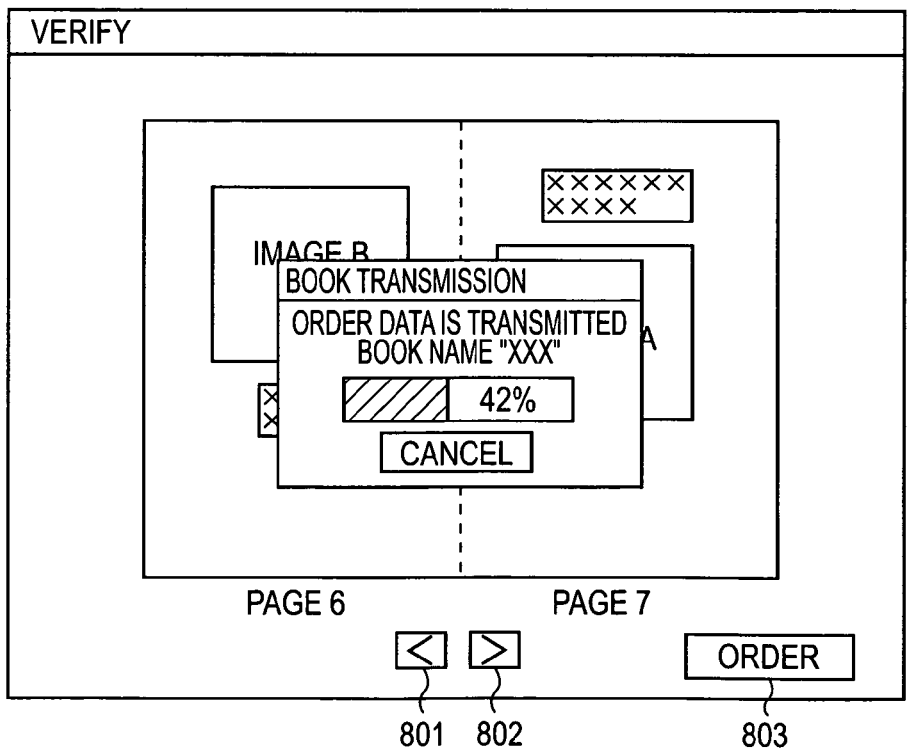
FIG. 9 shows another example configuration of the verification screen, wherein the state of order-data transmission is shown.

Turning back to FIG. 4, in step S403, after the "Order" button 803 is selected, the stored edited data in the special-purpose format is converted into data in the general-purpose format so that order data is generated. Namely, the album is edited by using a special-purpose-format-capable album-edit application program so that the edited data of the generated album is in the special-purpose format. However, when the user selects the "Order" button 803, the special-purpose-format edited data is converted into the general-purpose-format data. Subsequently, the general-purpose-format order data is generated. Then, in step S405, the generated general-purpose-format order data is transmitted to the server 101 via the network interface 211. The transmission state of the order data is superimposed on the verification screen of FIG. 8, as shown in FIG. 9.

When the order data is transmitted, personal-order information, information about the destination of the album, and so forth that are inputted by the user are also transmitted. The personal-order information includes, for example, the name of an orderer, the number of ordered album(s), and so forth.

Figure 5:
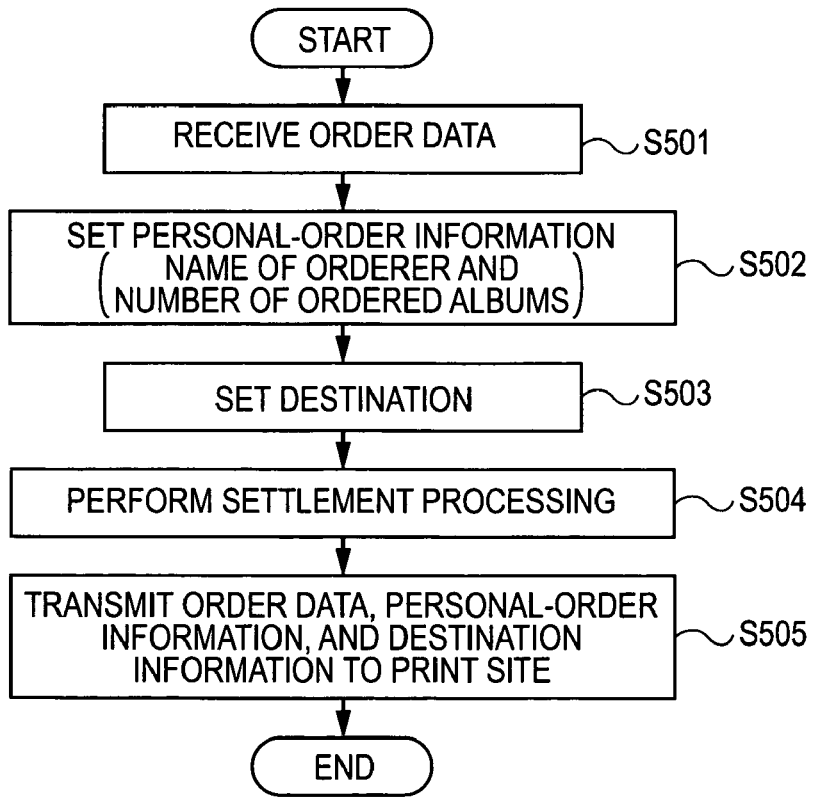
FIG. 5 is a flowchart showing the operations of a server according to the first embodiment.

Next, the operations of the server 101 will be described with reference to a flowchart shown in FIG. 5. Upon receiving, in step S501, the general-purpose-format order data, the personal-order information, and so forth that are transmitted from the user terminal 102, the server 101 sets the name of the orderer and the number of the ordered album(s), corresponding to the order, in step S502, and sets the album destination in step S503.

Next, in step S504, the server 101 performs settlement processing for the order between itself and the user terminal 102. After the settlement processing is finished, the server 101 sets a print service with whom print processing relating to the order data is charged, based on the type of the ordered album, the distance from the print service to the album destination, and so forth. Subsequently, a suitable print service is set.

Next, in step S505, the server 101 transmits the general-purpose-format order data, the personal-order information, and the destination information to the print site of the above-described set print service, such as the print site A 103. Upon receiving the above-described data, the print service of the print site A 103 performs print processing on the basis of the general-purpose-format order data, generates the ordered number of albums, and transmits the generated albums to the destination shown in the destination information. The print processing on the basis of the order data includes converting the general-purpose-format order data, transmitting the converted order data to a printer, and making the printer execute printing. The above-described procedures are performed at the print site A 103.

As described above, according to the first embodiment, the user terminal 102 converts the edited data that was generated by using the special-purpose-format template data into the edited data in the general-purpose-format and transmits the general-purpose-format edited data to the server 101. Subsequently, the server 101 does not have to prepare a converter for each of the print sites, and each of the print sites does not have to convert data transmitted thereto into an acceptable format, thus reducing the processing load on the server 101 side. Further, since the format is not converted on the server 101 side, there is no need to prepare a font that meets the requirements of the user terminal 102. Since there is no restraint on fonts, the user terminal 102 can use any font for generating the album.

Second Embodiment

Next, a second embodiment of the present invention will be described. The configuration of a print system and the hardware configuration of a user terminal according to the second embodiment are the same as those shown in FIGS. 1 and 2. Therefore, the description of the print system and the user terminal of the second embodiment are not provided.

Figure 12:
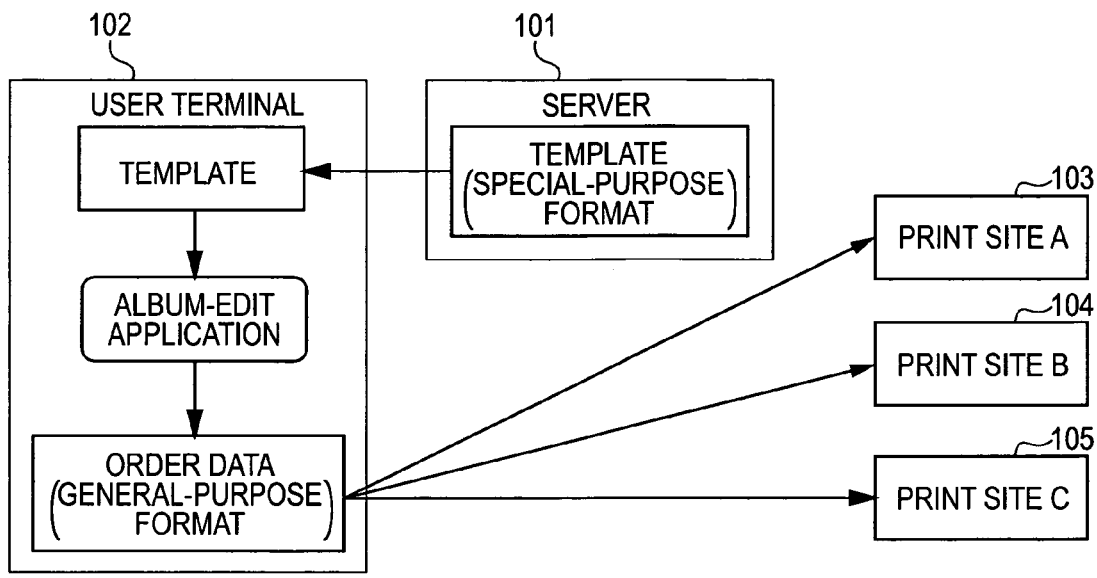
FIG. 12 illustrates the operations of a print system according to a second embodiment of the present invention.

Operations of the print system according to the second embodiment will now be described with reference to FIG. 12. The user terminal 102 downloads template data items in the special-purpose format from the server 101 and stores the downloaded template data items therein. A user of the print system selects a desired template data item from among the template data items stored in the user terminal 102, edits an album by arranging image data on the template data, thereby generating edited data. Here, the edited data is stored as data in the same special-purpose format as is the case with the template data.

If the user performs an operation for transmitting an order for the edited album on the user terminal 102, the edited data stored in the special-purpose format is converted into order data in the general-purpose format and the order data is transmitted to a desired print site, such as the print site A 103.

After the order data is transmitted to the print site A 103, the print service corresponding to the print site A 103 performs printing according to the order data in the general-purpose format and generates an album. The generated album is transmitted to a predetermined destination. The print processing on the basis of the order data includes converting the general-purpose-format order data, transmitting the converted order data to a printer, and making the printer execute printing by using a printer driver. The above-described procedures are performed at the print site A 103.

Figure 13:
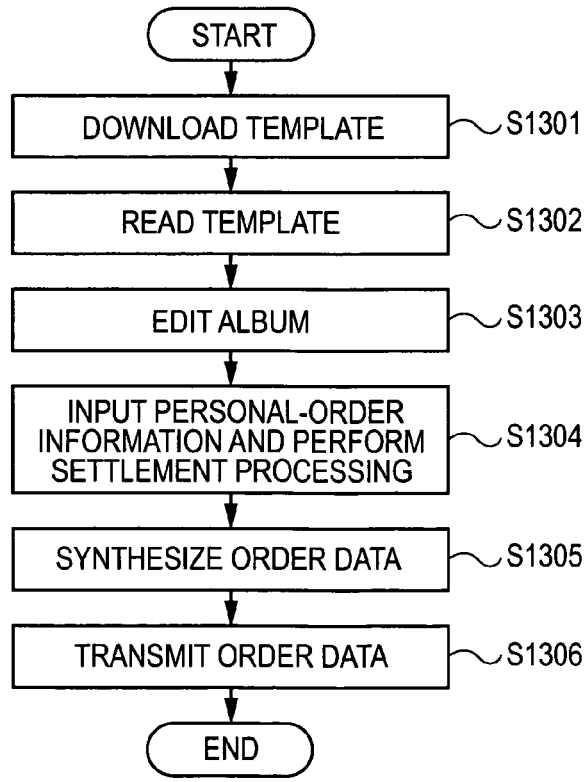
FIG. 13 is a flowchart illustrating the operations of a user terminal according to the second embodiment.
Figure 14:
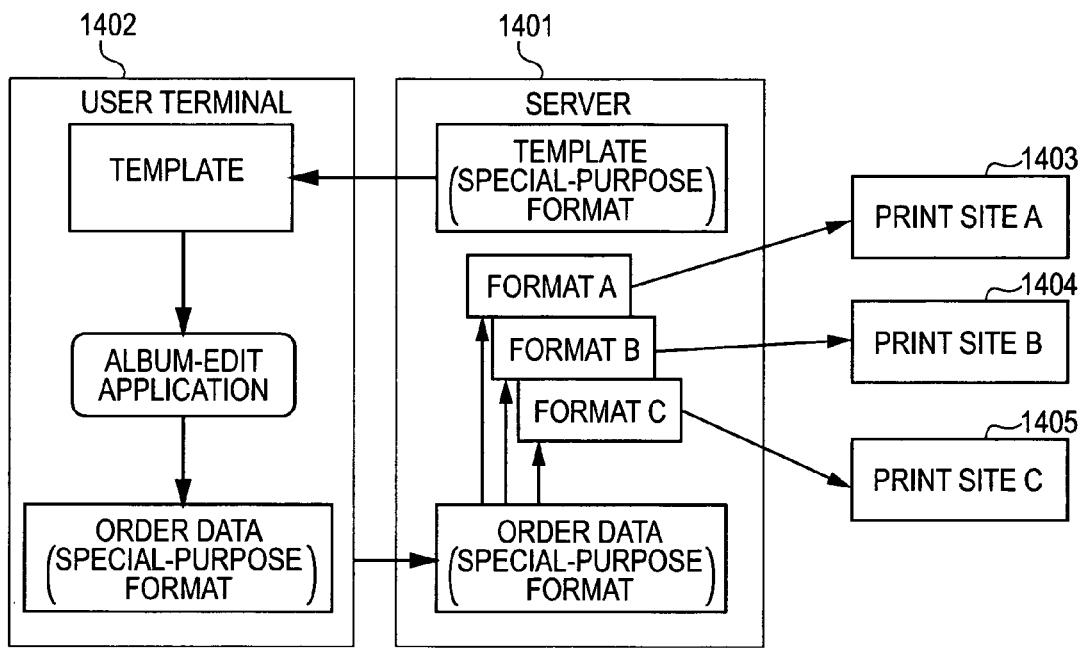
FIG. 14 is an example known print system.

Next, operations of the user terminal 102 will be described in detail with reference to a flowchart shown in FIG. 13. The user terminal 102 accesses the server 101 via the network interface 211 according to an operation performed by the user. Subsequently, the template-selection screen shown in FIG. 6, for example, is displayed on the CRT 201.

When the user selects a desired template on the template-selection screen and selects the "Download Template" button 601, information about an instruction to acquire the selected template is transmitted from the user terminal 102 to the server 101 via the network interface 211.

In step S1301, the template data corresponding to the above-described acquisition-instruction information is downloaded from the server 101 and stored in the HDD 209.

When the user selects a desired template data item from among template data items stored in the HDD 209, in step S1302, the selected template data item is read from the HDD 209 into the VRAM 208. Then, the selected template data item is displayed on the CRT 201 as, for example, the edit screen shown in FIG. 7.

On the other hand, data on an image photographed by a digital camera or the like is stored in the HDD 209. The part of the image data having been selected by the user, or the entire image data, is read into the VRAM 208 and displayed on the edit screen shown in FIG. 7. Next, in step S1303, the user edits an album on the edit screen. Since the details of the album editing are the same as those of the first embodiment, the description thereof is omitted.

Next, in step S1304, a desired print site such as the print site A 103 is selected from among the print sites A 103, B 104, or C 105, and settlement processing is performed between the user terminal 102 and the selected print site A 103. Further, the personal-order information including the name of an orderer, the number of ordered album(s), and so forth, and the album-destination information or the like are transmitted.

Then, in step S1305, the "Order" button 803 is selected on the screen shown in FIG. 8, whereby the CPU 206 converts the stored edited data in the special-purpose format into data in the general-purpose format and generates order data. The generated general-purpose-format order data is then transmitted to the print site 103 via the network interface 211 in step S1306. In another embodiment, steps S1304 and S1305 may be performed in reverse order.

Upon receiving the above-described order data or the like, the print service of the print site 103 performs print processing according to the general-purpose-format order data, generates the ordered number of albums, and transmits the generated albums to the destination shown in the destination information.

Thus, according to the second embodiment, the user terminal 102 converts the edited data in the special-purpose format, generated by using the special-purpose-format template data, to the edited data in the general-purpose-format and transmits the general-purpose-format edited data so that the general-purpose-format edited data is transmitted to each of the print sites without the intervention of the server 101. Subsequently, the server 101 does not have to prepare a converter for each of the print sites, each of the print sites does not have to convert data transmitted thereto into data in an acceptable format, and data transfer to the print sites becomes unnecessary, which reduces the processing load on the server 101 side. Further, as in the case of the first embodiment, the server 101 and the print sites do not have to prepare fonts that meet the requirements of the user terminal 102. Since there is no restraint on fonts, the user terminal 102 can use any font for generating the album.

It is to be understood that the object of the present invention can also be achieved by supplying a storage medium storing program code of software for implementing the functions of the embodiments to an apparatus or system so that a computer (CPU, MPU, etc.) of the apparatus or system reads and executes the program code stored in the storage medium.

In that case, the program code itself, read from the storage medium, achieves the functions of the above-described embodiments, and thus the storage medium storing the program code and the program code itself constitute the present invention.

The storage medium for providing the program code may be, for example, a floppy disk, a hard disk, an optical disk, a magneto-optical disk, a CD-ROM, a CD-R, a magnetic tape, a non-volatile memory card, a ROM, and so forth.

Furthermore, not only by the computer reading and executing the program code, but also by the computer executing part of or the entire process utilizing an OS, etc. running on the computer based on instructions of the program code, the functions of the above-described embodiments may be achieved. The latter is also one of embodiments of the present invention.

In another embodiment of the present invention, the program code read from the storage medium may be written into a memory of a function extension board inserted in the computer or a function extension unit connected to the computer. The functions of the above-described embodiments may be realized by executing part of or the entire process by a CPU, etc. of the function extension board or the function extension unit based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-257624 filed on Sep. 3, 2004, which is hereby incorporated by reference herein in its entirety.

What is claimed is:

1. An information processing system that a data edit apparatus and a plurality of server apparatuses are connected together via a network, the data-edit apparatus comprising:
a processor that executes a computer program; and
a memory on which is memorized the computer program that, when executed by the processor, performs the steps of:
inputting at least one of images and texts from a storage device;
downloading template data to be used for arranging the images and texts from a first server apparatus, the template data having a first format;
generating edited data by arranging the images and texts in the template data, the edited data having the first format;
converting a format of the edited data from the first format to a second format which is different from the first format; and
transmitting the edited data having the second format and address information showing the address of a printed material of the edited data to the first server apparatus, the first server apparatus comprising:
a processor that executes a computer program; and
a memory on which is memorized the computer program that, when executed by the processor, performs the steps of:
selecting a second server apparatus which is to be the address of the edited data having the transmitted second format based on the transmitted address information, not based on the type of the format of the transmitted edited data, from among the plurality of the second server apparatuses;
transmitting the edited data having the transmitted second format from the first server apparatus to the selected second server apparatus, the second server apparatus comprising:
a processor that executes a computer program; and
a memory on which is memorized the computer program that, when executed by the processor, performs the steps of:
executing printing process of the edited data having the transmitted second format.

2. The information processing system according to claim 1, wherein the first format data is electronic-album template data for arranging the image data or text data.

3. A method for editing data using an information processing system that a data edit apparatus and a plurality of server apparatuses are connected together via a network, the data edit apparatus having a processor that executes a computer program and a memory on which is memorized the computer program that, when executed by the processor, performs the method; the method comprising:
inputting at least one of images and texts from a storage device;
downloading template data to be used for arranging the images and texts from a first server apparatus, the template data having a first format;
generating edited data by arranging the images and texts in the template data, the edited data having the first format;
converting a format of the edited data from the first format to a second format which is different from the first format; and
transmitting the edited data having the second format and address information showing the address of a printed material of the edited data to the first server apparatus, the first server apparatus comprising:
a processor that executes a computer program; and
a memory on which is memorized the computer program that, when executed by the processor, performs the steps of:
selecting a second server apparatus which is to be the address of the edited data having the transmitted second format based on the transmitted address information, not based on the type of the format of the transmitted edited data, from among the plurality of the second server apparatuses;
transmitting the edited data having the transmitted second format from the first server apparatus to the selected second server apparatus, the second server apparatus comprising:
a processor that executes a computer program; and
a memory on which is memorized the computer program that, when executed by the processor, performs the steps of:
executing printing process of the edited data having the transmitted second format.

4. A computer readable storage medium that carries a program of instructions for editing data using an information processing system that a data edit apparatus and a plurality of server apparatuses are connected together via a network, the data edit apparatus having a processor that executes the program of instructions to edit data, the program of instructions comprising:
a first set of instructions for inputting at least one of images and texts from a storage device;
a second set of instructions for downloading template data to be used for arranging the images and texts from a first server apparatus, the template data having a first format;

a third set of instructions for generating edited data by arranging the images and texts in the template data, the edited data having the first format;

a fourth set of instructions for converting a format of the edited data from the first format to a second format which is different from the first format; and a fifth set of instructions for transmitting the edited data having the second format and address information showing the address of a printed material of the edited data to the first server apparatus, the first server apparatus comprising:

a processor that executes a computer program; and a memory on which is memorized the computer program that, when executed by the processor, performs the steps of:

selecting a second server apparatus which is to be the address of the edited data having the transmitted second format based on the transmitted address information, not based on the type of the format of the transmitted edited data, from among the plurality of the second server apparatuses;

transmitting the edited data having the transmitted second format from the first server apparatus to the selected second server apparatus, the second server apparatus comprising:

a processor that executes a computer program; and a memory on which is memorized the computer program that, when executed by the processor, performs the steps of:

executing printing process of the edited data having the transmitted second format.

* * * * *